(12) United States Patent
Pozgainer

(10) Patent No.: US 6,736,164 B2
(45) Date of Patent: May 18, 2004

(54) PRESSURE CONTROL VALVE FOR A FUEL TANK

(75) Inventor: Günther Pozgainer, Graz (AT)

(73) Assignee: Tesma Motoren-und Getrieaetechnik Ges.m.b.H., Sinabelkirchen (AT)

(*) Notice: Subject to any disclaimer, the term of this patent is extended or adjusted under 35 U.S.C. 154(b) by 68 days.

(21) Appl. No.: 10/263,967

(22) Filed: Oct. 3, 2002

(65) Prior Publication Data

US 2003/0089406 A1 May 15, 2003

(30) Foreign Application Priority Data

Oct. 4, 2001 (AT) ........................................ 764/2001 U

(51) Int. Cl.[7] .............................................. F02M 33/02
(52) U.S. Cl. ............. 137/587; 137/565.25; 137/516.27; 137/588; 137/592
(58) Field of Search ................................ 137/587, 588, 137/592, 516.25, 516.27, 516.29

(56) References Cited

U.S. PATENT DOCUMENTS

| | | | | |
|---|---|---|---|---|
| 874,652 A | * | 12/1907 | Bailey | 137/516.25 |
| 2,213,998 A | * | 9/1940 | Sifkovitz | 137/516.27 |
| 2,263,750 A | * | 11/1941 | Willke | 137/565.25 |
| 2,341,018 A | * | 2/1944 | Clapp | 137/516.25 |
| 3,587,632 A | * | 6/1971 | Clay | 137/516.29 |
| 5,052,435 A | * | 10/1991 | Crudup et al. | 137/516.29 |
| 5,630,445 A | * | 5/1997 | Horiuchi et al. | 137/592 |
| 6,340,031 B1 | * | 1/2002 | Matsumoto | 137/516.29 |

* cited by examiner

*Primary Examiner*—A. Michael Chambers
(74) *Attorney, Agent, or Firm*—Bachman & LaPointe, P.C.

(57) ABSTRACT

A pressure control valve for a fuel tank with a spring-loaded valve body is intended to combine a maximum sealing effect with an unobstructed and reliable response. This is achieved in that the valve body comprises a foot part and a plate, the foot part being guided displaceably in the valve housing in the axis of symmetry, the plate having, in a staggered manner, a first groove and a second groove for holding a first sealing ring and a second sealing ring, the two sealing rings bearing against the sealing surface when the valve is closed and being flowed around in series when the valve is open.

11 Claims, 4 Drawing Sheets

PRESSURE CONTROL VALVE FOR A FUEL TANK

BACKGROUND OF THE INVENTION

The invention relates to a pressure control valve for a fuel tank, comprising a valve housing fitted on the fuel tank or on its filler neck, and a valve body which is spring-loaded in the direction of a rotationally symmetrical sealing surface. Valves of this type are required as a safety valve in order, firstly, to prevent the emission of fuel vapors, and, secondly, when there is a rise in pressure (for example because of a rise in temperature when exposed to the sun), to prevent too great a rise in pressure in the interior of the fuel tank. In this case, the emission limits, which are becoming ever stricter, require maximum imperviousness of the valve in the closed state; in particular also imperviousness to fuel vapors. The latter can flow more easily past a sealing ring than liquids and can also pass through by diffusion.

Pressure control valves of the generic type which are known in practice do not satisfy these requirements. Conventional methods for improving the imperviousness influence the response pressure and impede a prompt response. Therefore, the object of the invention is to provide pressure control valves which combine a maximum sealing effect with an unobstructed and reliable response with the requirements in terms of costs and space being as low as possible.

SUMMARY OF THE INVENTION

The foregoing object is attained, according to the invention, wherein the valve body comprises a foot part and a plate, the foot part being guided displaceably in the valve housing in the axis of symmetry, and the plate has, in a staggered manner, a first groove and a second groove for holding a first sealing ring and a second sealing ring, the two sealing rings bearing against the sealing surface when the valve is closed and being flowed around in series when the valve is open.

The two staggered sealing rings have the effect, first of all, that it is always only atmospheric pressure which acts on the second, outer sealing ring when the valve is closed, even when an increased internal pressure of the tank is acting on the first sealing ring. As a result, even when the two sealing rings have the same structure, the sealing effect of the outer one is greater.

The foot part, which is guided concentrically in the valve housing in the axis of symmetry, ensures a ready response, even after a very long period of not responding, without becoming caught. The addition of a second sealing ring is not only a simple duplication. It creates the possibility of providing an effective seal against media of various states of aggregation (liquid, vapor, air). The second sealing ring is protected by the first sealing ring against contact with liquid fuel, and can thus consequently be designed as a gas seal or vapor seal. For this purpose, it can be designed to be harder than the first one (claim 4), which, in the simplest case, results in a graduation of the contact pressure, or can consist of a material of high permeation resistance, which is possibly less suitable as a liquid seal.

By means of the second sealing ring, which is recessed into the groove, a narrow gap can be set which reduces the contact surface between the second sealing ring and the fuel vapor to a minimum. Since the quantity which diffuses in is proportional to the contact surface, the quantity which permeates is thereby further considerably reduced. By suitable coordination of the groove depths and dimensions of the sealing rings, the sealing effect of the two staggered sealing ring arranged "in series" can be coordinated optimally with each other.

A particularly neat guidance of the plate and a compact constructional form of the valve are achieved in that the valve housing comprises a housing case and a housing cover, on which housing cover a guide for the foot part is formed, and in that a compression spring is supported at one end on the housing cover and at the other end on the plate. In a particularly simple and inexpensive embodiment, the rotationally symmetrical sealing surface is formed on the fuel tank or on its filler neck.

In a preferred embodiment, the plate is conical, the first sealing ring, which faces the interior of the fuel tank, having, with respect to the axis of symmetry, a smaller radius than the second sealing ring (the same applies, of course, for the first and second grooves), and the rotationally symmetrical sealing surface is likewise conical.

In a particularly effective development of the invention, the first sealing ring lies in a groove formed in a further plate, and can be shifted with respect to the plate in the direction of the axis of symmetry. This can be brought about, for example, by a deformable design and dimensioning of the further plate.

In a further refinement of this development, the further plate can be displaced with respect to the plate in the direction of the axis of symmetry, and a further compression spring is supported at its one end on the plate and at its other end on the further plate. By making the two sealing rings independent, each with its own plate, not only is an even better optimization of the sealing effects of the two sealing rings obtained. Moreover, a buffer space is produced between the two plates, in which pressure peaks are reduced and a relatively large pressure effect surface of the plate [lacuna] with the second sealing ring.

A very practical design is achieved in that a groove for a sealing ring, or for both sealing rings, is bounded on the side closer to the axis of symmetry by a retaining element, a cover clipped onto the plate or a ring. As a result, the respective sealing ring is fastened on the or its plate, and thus can also be interchanged without being overstretched. Above all, however, the sealing surface of the plate can thus be injection molded in a relatively simply mold and, in addition, can be made without any burrs.

Furthermore, the sealing surface can be part of the case of the valve housing. The completely fitted and tested valve can therefore be fitted on the vehicle tank or on its filling pipe.

In an advantageous development of the valve according to the invention, the housing cover has a cylindrical wall part in which radially protruding, resilient tongues are formed, said tongues engaging in corresponding recesses in the housing case. This simplifies construction and installation and provides a reliable connection.

BRIEF DESCRIPTION OF THE DRAWINGS

The invention will be described and explained below with reference to figures, in which.

DETAILED DESCRIPTION

Figure 1:
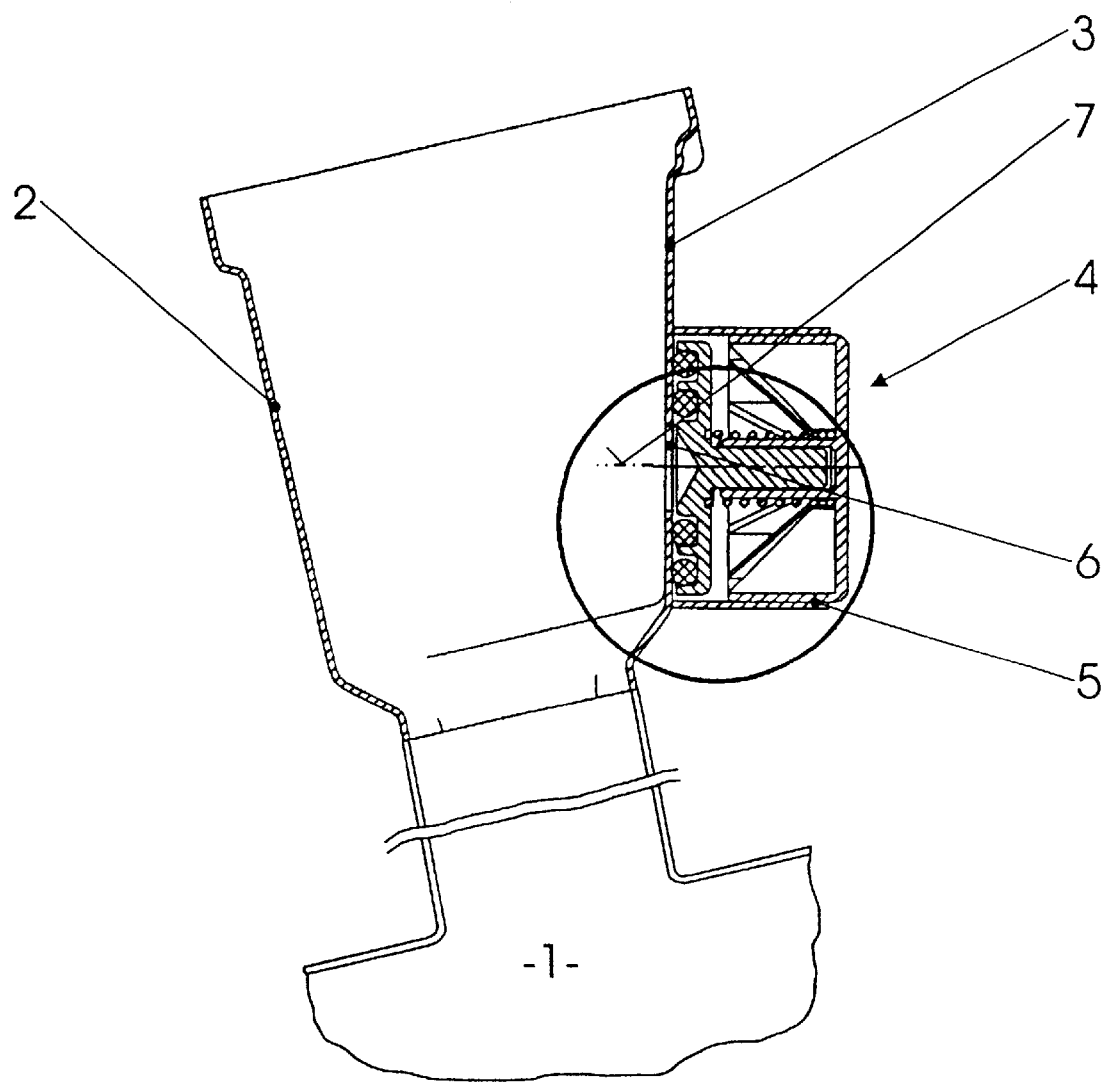
FIG. 1 shows a section through part of a fuel tank having the valve according to the invention in a first embodiment.

In FIG. 1, only part of the fuel tank 1 is indicated together with its filling pipe 2 or stub of the fuel tank. Whether on a wall of the fuel tank 1 itself or on a wall of the filling pipe 2 or of a part connected to the tank, a pressure control valve 4 according to the invention is always fitted to a wall 3. It is enclosed by a housing 5 which is fitted via a circular opening 6 in the wall 3 having the same axis of symmetry 7.

Figure 2:
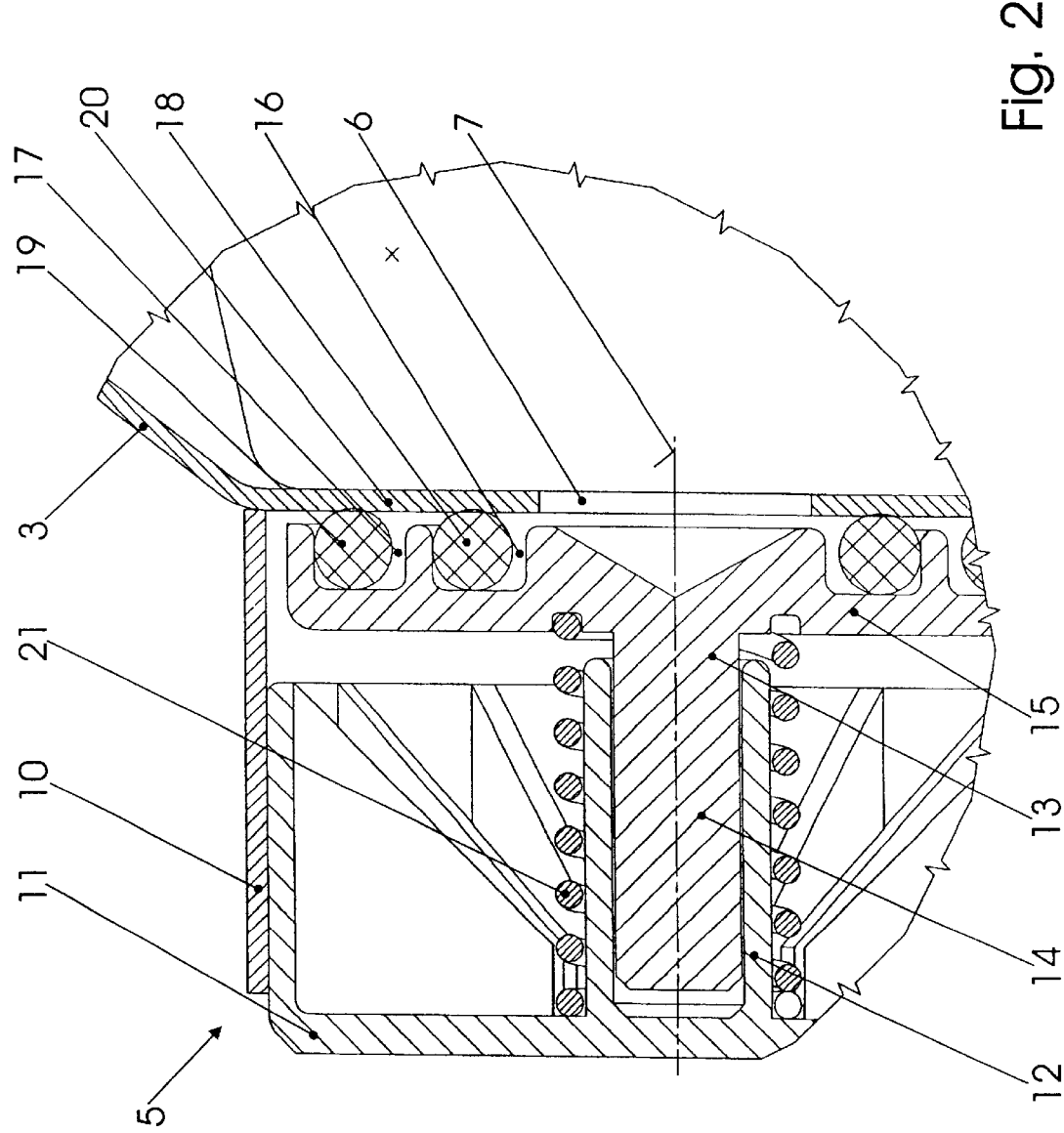
FIG. 2 shows detail B in FIG. 1, enlarged.

In FIG. 2, a cylindrical housing case is denoted by 10 and a housing cover by 11. The housing cover 11 has a tubular, concentric guide 12 for a valve body 13 which can be displaced along the axis of symmetry 7 with its foot part 14 in the guide 12. The valve body 13 furthermore has a plate 15 having a first groove 16 and a second groove 17 for a first sealing ring 18 and a second sealing ring 19. The grooves 16, 17 are provided on that side of the plate 15 which faces a sealing surface 19.

The valve is illustrated in the closed state in which the sealing rings 18, 19 are pressed on by a compression spring 21 acting on the plate 15. The compression spring 21 is supported at one end on the housing cover 11 and at the other end on the plate 15, but could also engage on another part of the valve body 13. In a similar manner to the grooves 16, 17, the sealing rings 18, 19 are circular about the axis of symmetry 7. The sealing rings 18, 19 are also circular in cross section here, but may also have a different cross section and differ both with regard to size and material. In particular, the second sealing ring 19 consists of an elastomer of high permeation resistance.

Figure 3:
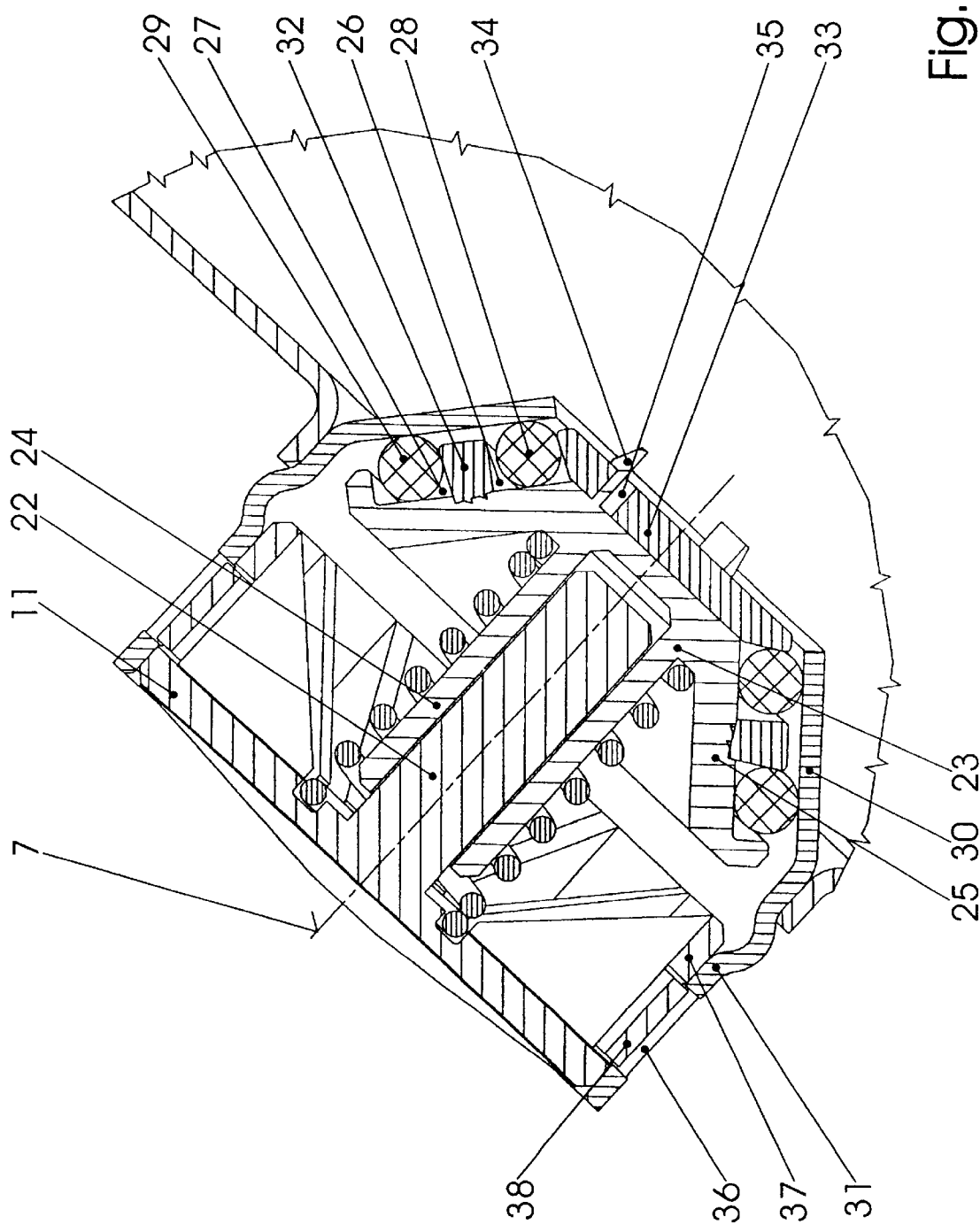
FIG. 3 is as FIG. 2, but in a variant of the first embodiment.

The variant of FIG. 3 differs from FIG. 2 only with regard to the design of the housing and the arrangement of the sealing rings. The guide 22 here is a cylindrical pin lying in the axis of symmetry 7 and the valve body 23 has a tubular foot part 24 which is guided on the pin 22. Furthermore, the valve body 23 has a conical plate 25 whose imaginary cone tip lies in the interior of the fuel tank or filling pipe. Accordingly, the first and second grooves 26, 27 and the first and second sealing rings 28, 29 lie on different radii. The sealing rings 28, 29 are pressed by the compression spring onto a conical sealing surface 30 which here is part of the housing case 31.

In order to retain the sealing rings 28, 29 in their grooves, a retaining ring 32 and a retaining plate 33 are provided, the latter having openings 35 into which hooks 34 of the plate 25 snap. For the connection between the housing case 31 and the housing cover 11, the former has a plurality of apertures 36 which are distributed over the circumference and in which resilient tongues 38 disengaged from a cylindrical wall part 37 of the housing cover 11 engage.

Figure 4:
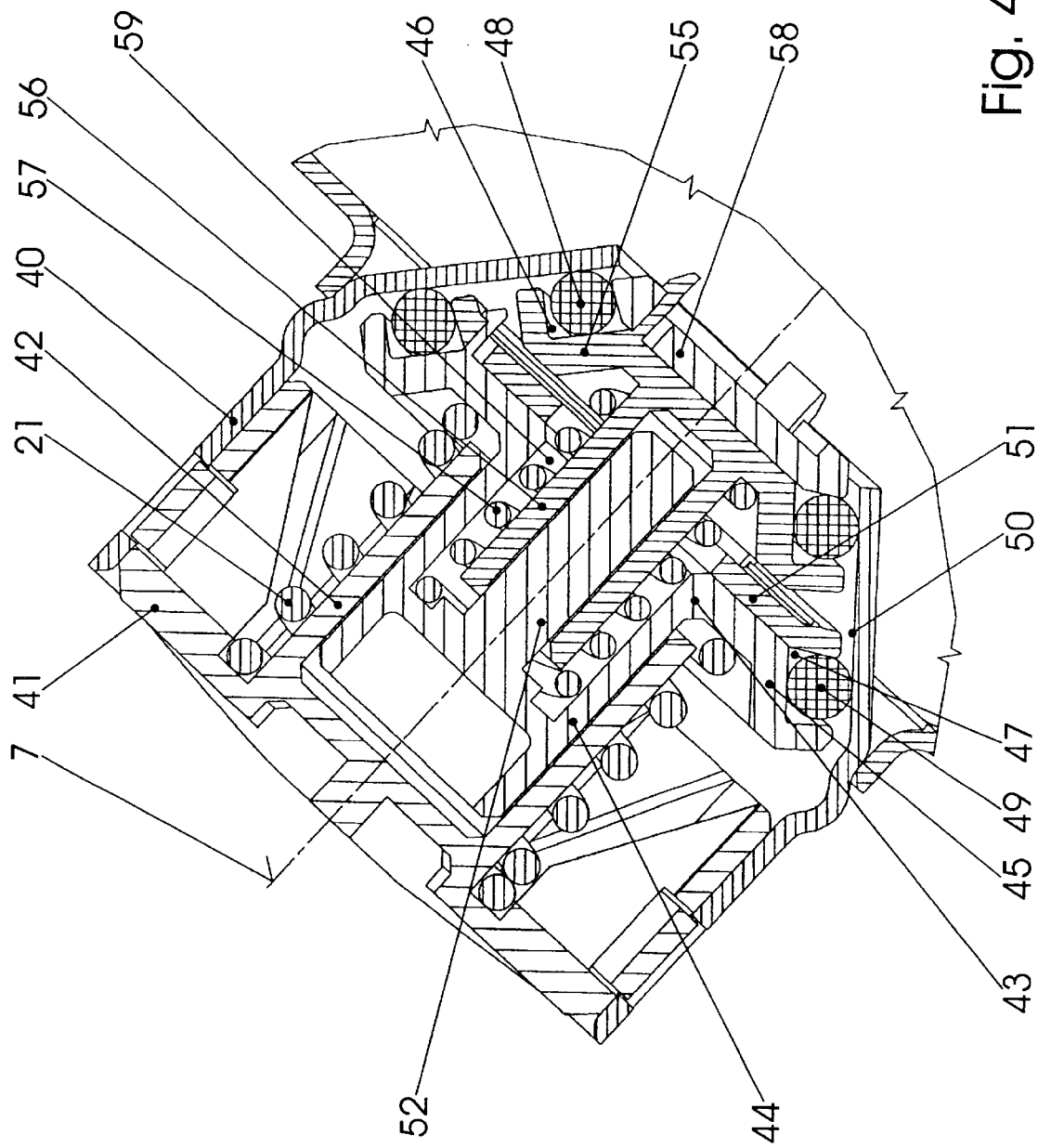
FIG. 4 is as FIG. 2, but in a second embodiment.

A further embodiment is depicted in FIG. 4. The housing again comprises a housing case 40 and a housing cover 41 in which a tubular guide 42 for a valve body 43 protrudes concentrically inward. The foot part 44 of said valve body can be displaced in the guide 42 in the direction of the axis of symmetry 7. The plate 45 of the valve body 43 has only a second groove 47 which accommodates a second sealing ring 49. The plate 45 is pressed against a conical sealing surface 50 by the spring 21. The second sealing ring 49 is again retained in its groove 47 by means of a retaining plate 51 which is clipped in.

The foot part 44 of the valve body 43 is itself of tubular design and has in the center a concentric guide pin 52 for a further foot part 56 of a further plate 55. This further valve body can be displaced with respect to the previously described valve body 43 in the direction of the axis of symmetry counter to the force of a further compression spring 57. Situated in the further plate 55 is a first groove 46 which holds a first sealing ring 48. The latter is also pressed against the sealing surface 50 when the valve is closed and, moreover, is retained in its groove by a further retaining plate 58.

Between the valve body 43 and the further plate 55 with its foot part 56, a space is created in which the further compression spring 57 is situated and which serves as a buffer space. The further compression spring 57 is weaker than the compression spring 21, so that first of all the further plate 55 lifts off as the pressure in the fuel tank rises. If it only involves a temporary pressure peak, the latter is consequently worn down in the buffer space 59, with the result that then the (main) valve body 43 no longer has to be displaced at all. In such a case, no vapor at all escapes to the outside. Only on a further rise in pressure does the (main) valve body 43 also open.

If vapor/gas has then also passed the second sealing ring 49, it can escape either through openings (not illustrated) in the housing cover 41 or through the apertures 36 described with reference to FIG. 3. The essential feature is that the design according to the invention of the valve allows virtually nothing to escape or diffuse through the seals in the normal steady state condition. This is essential for a "near-zero-emission-vehicle" required in future.

What is claimed is:

1. A pressure control valve for a fuel tank, comprising a valve housing fitted on one of the fuel tank and the filler neck of the fuel tank, and a valve body spring-loaded in the direction of a rotationally symmetrical sealing surface, wherein
    a) the valve body comprises a foot part and a plate, the foot part being guided displaceably in the valve housing in the axis of symmetry,
    b) the plate having a first groove and a second groove for holding a first sealing ring and a second sealing ring, respectively, the two sealing rings bearing against the sealing surface when the valve is closed and being in series with respect to fuel flow when the valve is open.

2. The pressure control valve as claimed in claim 1, wherein the valve housing comprises a housing case and a housing cover, on which housing cover a guide for the foot part is formed, and wherein a compression spring is supported at one end on the housing cover and at the other end on the plate.

3. The pressure control valve as claimed in claim 1, wherein the rotationally symmetrical sealing surface is formed on one of the fuel tank and the filler neck of the fuel tank.

4. The pressure control valve as claimed in claim 1, wherein the second sealing ring is harder than the first sealing ring.

5. The pressure control valve as claimed in claim 1, wherein the second sealing ring consists of an elastomer with high permeation resistance.

6. The pressure control valve as claimed in claim 1, wherein the plate is conical, the first sealing ring, which faces the interior of the fuel tank, having, with respect to the axis of symmetry, a smaller radius than the second sealing ring, and wherein the rotationally symmetrical sealing surface is conical.

7. The pressure control valve as claimed in claim 1, wherein the first sealing ring lies in a groove formed in a further plate, and can be shifted with respect to the plate in the direction of the axis of symmetry.

8. The pressure control valve as claimed in claim 7, wherein the further plate can be displaced with respect to the plate in the direction of the axis of symmetry, and a further compression spring bears with one end against the plate and with the other end against the further plate.

9. The pressure control valve as claimed in claim 5, wherein at least one of the first and second groove for the respective sealing ring is bounded on the side closer to the axis of symmetry by a retaining element clipped onto the plate.

10. The pressure control valve as claimed in claim 5, wherein the sealing surface is part of the case of the valve housing.

11. The pressure control valve as claimed in claim 1, wherein the housing cover has a cylindrical wall part in which radially protruding, resilient tongues are formed, said tongues engaging in corresponding apertures in the housing case.

* * * * *